(12) United States Patent
Strmen

(10) Patent No.: US 6,325,967 B1
(45) Date of Patent: Dec. 4, 2001

(54) INCINERATION PROCESS

(75) Inventor: Jan Strmen, Baie d'Urfe (CA)

(73) Assignee: Material Resource Recovery SRBP Inc., Cornwall (CA)

( * ) Notice: Subject to any disclaimer, the term of this patent is extended or adjusted under 35 U.S.C. 154(b) by 0 days.

(21) Appl. No.: 09/274,628

(22) Filed: Mar. 23, 1999

Related U.S. Application Data

(60) Provisional application No. 60/079,544, filed on Mar. 27, 1998, and provisional application No. 60/080,965, filed on Apr. 7, 1998.

(51) Int. Cl.$^7$ ...................................................... A61L 9/00
(52) U.S. Cl. .................. 422/4; 110/236; 422/4; 422/168; 422/169; 422/170; 422/171; 422/172; 75/403; 588/228; 588/229; 588/230
(58) Field of Search .................. 110/341, 4, 5, 110/120, 168, 169, 182, 307, 308; 422/224, 242.1; 423/245.3; 431/5

(56) References Cited

U.S. PATENT DOCUMENTS

| | | | |
|---|---|---|---|
| 3,639,111 | 2/1972 | Brink et al. | 48/111 |
| 4,136,624 | 1/1979 | Kato et al. | 110/236 |
| 4,399,112 | 8/1983 | Voirin | 423/230 |
| 4,913,069 | * 4/1990 | Schultz et al. | 110/346 |
| 4,951,583 | 8/1990 | McGill et al. | 110/346 |
| 5,112,216 | * 5/1992 | Tenn | 431/5 |
| 5,233,933 | 8/1993 | McSorley et al. | 110/246 |
| 5,562,053 | 10/1996 | Lim | 110/246 |

FOREIGN PATENT DOCUMENTS

| | | |
|---|---|---|
| 1067346 | 12/1979 | (CA) . |
| 1180602 | 10/1985 | (CA) . |
| 1286161 | 7/1992 | (CA) . |
| 1307166 | 9/1992 | (CA) . |
| 1330251 | 6/1994 | (CA) . |
| 2241741 | 7/1997 | (CA) . |
| 0 437 666 | 7/1991 | (EP) . |

OTHER PUBLICATIONS

Partial copy of "Application for Approval of a Waste Disposal Site" to Ministry of Environment & Energy, Government of Ontario, Toronto, Ontario (4 page application form, 9 page process description and 5 page appendix including flow diagrams and further description of Mercaptan Incineration.

Partial copies of public notices dated Mar. 19 and Mar. 27, 1997 of Application for Approval as posted by the Ministry of Environment.

Copy of opinion letter of Nov. 16, 1998 of John Tidball from the law firm of Miller Thomas expressing the opinion that members of the public would not have had access to the application papers filed in Feb. of 1997 until a substantially later point in time.

* cited by examiner

*Primary Examiner*—Robert J. Warden, Sr.
*Assistant Examiner*—Imad Soubra
(74) *Attorney, Agent, or Firm*—Killworth, Gottman, Hagan & Schaeff, L.L.P.

(57) ABSTRACT

A process and apparatus for incinerating certain volatile organic compounds especially odorants commonly used in the natural gas industry. The procedure uses a first (car bottom) furnace as a heating chamber, where precise temperature control during both low and high temperature process stages ensures safe and controlled feed of volatile substances into a second (primary) furnace for incineration. The combustion process is completed in an afterburner and all generated gases are scrubbed in a conventional wet scrubber.

9 Claims, 5 Drawing Sheets

INCINERATION PROCESS

CROSS REFERENCE TO RELATED APPLICATIONS

This application is entitled to the benefit of provisional applications 60/079,544 and 60/080,965 filed Mar. 27, 1998 and Apr. 7, 1998 respectively.

BACKGROUND OF INVENTION

This invention relates to a process and apparatus for incinerating certain volatile organic compounds especially odorants commonly used in the natural gas industry.

Disposal of metal containers containing odorous materials including odorant mixtures used, among others, by the natural gas industry presents a disposal problem, since chemical, physical and other means of decontamination or destruction do not remove odor causing compounds completely. Disposal of such containers poses environmental liability and other odor related problems.

The term odorant as used in the natural gas industry refers to chemicals such as dimethyl sulfide, methyl ethyl sulfide, isopropyl mercaptan, normal propyl mercaptan, secondary butyl mercaptan, ethyl mercaptan, tetrahydrothiophene, and similar compounds. The above are all organic compounds containing sulfur, with an easily distinguishable odor used to odorize natural gas. All of these are volatile liquids.

Thermal destruction of odor causing substances presents a viable solution for treatment of contaminated metal containers but safety and process control must be ensured.

Removal and decontamination of metal containers containing solvents, sludges and solid organic compounds presents a host of environmental, safety and technical problems, which make this process difficult and expensive. Following is a summary of most immediate problems associated with decontamination and disposal of metal containers contaminated or containing solvents, sludges or solid organic materials, very often mixed with inorganic compounds.
Environmental concerns:
1. Release of volatile compounds into atmosphere,
2. Odor problems
3. Spill danger
4. Effect of treated compounds on human health.
Safety concerns:
1. Fire and explosion danger due to the release of vapors into the environment.
2. Fire and explosion danger during dismantling of these containers using spark generating tools or open flame tools.
3. Exposure of tool operators to possibly dangerous concentrations of organic volatile substances.
Technical concerns.
1. Dismantling of contaminated metal containers has to be done in inert atmosphere or using other tools not generating sparks or open flame.
2. Containers would have to be decontaminated after initial dismantling or opening of tanks, which increases incident and accident potential.

SUMMARY OF THE INVENTION

An object of the present invention is to provide for-the safe and complete destruction of certain volatile organic compounds especially such compounds when disposed in metal containers.

Another object is to provide a multistage process, which separates evaporation from incineration and allows for safe, complete and environmentally sound destruction of these volatile organic compounds. The process is believed to be superior in these respects from existing chemical or other thermal methods of destruction.

A process for the destruction of volatile organic compound(s) in accordance with the invention in one aspect comprises:
(a) heating said compound(s) in a first enclosure to temperatures adequate to effect evaporation of the compound(s) under conditions which do not support the combustion of said compound(s);
(b) conducting the vapours of said compound(s) generated by heating step (a) from the first enclosure to a second enclosure and incinerating said vapour in the second enclosure.

As a preferred feature of the invention the heating in step (a) effects a controlled temperature increase under conditions wherein there is insufficient oxygen to support combustion of said vapours in the first enclosure.

In a preferred embodiment of the invention said compound(s) are in the form of a residue in a closed metal container with said metal container being positioned in said first enclosure prior to the heating in step (a) and connected to a system capable of conducting said vapours generated by heating step (a) from the interior of the metal container to the second enclosure.

In a preferred form of the invention the process includes the step of supplying inert gases under pressure to the interior of said metal container prior to commencement of heating step (a) and releasing the pressurized gases into said second enclosure prior to effecting heating step (a).

Still further according to an aspect of the invention said heating step (a) preferably comprises gradually raising the temperature in said first enclosure to initially evaporate the lower boiling and more volatile compound(s) with evaporation of higher boiling compound(s) following thereafter as the temperature is raised to and held at higher levels for selected periods of time to complete the evaporation and to decompose and/or carbonize any remaining said compounds.

In a typical embodiment of the invention said first enclosure comprises a furnace having a heating means therein to generate the desired temperatures to effect said evaporation and wherein said second enclosure comprises a primary furnace wherein incineration of the vapours released during heating step (a) is effected.

The process also typically includes the step of passing combustion products from said primary furnace through an afterburner to complete the combustion process followed by scrubbing.

The compounds referred to above may comprise sulfur-containing odorants for natural gas as well as numerous other volatile organic materials. Typical odorants include dimethyl sulfide methyl ethyl sulfide, isopropyl mercaptan, normal propyl mercaptan, secondary butyl mercaptan, ethyl mercaptan, tetrahydrothiophene, and similar compounds.

The process of the invention, in summary, is particularly advantageous for volatile substances such as mercaptans, other sulfur containing solvents and solvents in general, where temperature control of and subsequent feed control into the primary furnace must be strictly regulated. Temperature control, combustion products control, proper connection of treated containers to the primary furnace as well as safety features including the controlling of temperatures, pressures in treated containers and feed rates are important practical considerations.

Apparatus for the destruction of volatile organic compounds in accordance with a further aspect of the invention includes:

(a) a first furnace for heating said compounds to temperatures adequate to effect evaporation thereof under conditions which do not support combustion of said compounds;

(b) a second furnace for incinerating the vapours generated in the first furnace, and (c) a system for transporting the vapours from the first furnace to the second furnace while maintaining said non-combustion supporting conditions until the vapours reach the second furnace.

In a preferred form of the invention said first furnace has a heating means therein to generate the desired temperatures to effect said evaporation and said second furnace comprises a primary furnace having a supply of free oxygen thereto and wherein incineration of the vapours released during the heating in the first furnace is effected.

As noted previously said compound(s) are typically in the form of residues in a closed metal container with said first furnace being adapted to receive said metal container therein prior to the heating thereof, said vapour transporting system being capable of being attached to the metal container for conducting said vapours from the interior of the metal container to the second furnace.

A further feature of the invention is the use of a manifold system adapted to supply inert gases to the interior of said metal container to pressurize same prior to said heating, said vapour transporting system being adapted to subsequently release the pressurized inert gases into said second furnace also prior to commencement of the heating in said first furnace.

An afterburner through which combustion products from said primary furnace are passed to complete the combustion process is also a part of the preferred form of the equipment.

In summary, the preferred apparatus used includes a first (car bottom) furnace as a heating chamber, where precise temperature control during both low and high temperature process stages ensures a safe and controlled feed of volatile substances into a second (primary) furnace for incineration. The combustion process is completed in an afterburner and all generated gases are scrubbed in a conventional wet scrubber. The preferred form of the invention thus combines evaporation of the residual organic compounds from contaminated containers and subsequent high temperature treatment destroying all remnants of these compounds in the same furnace system. In other words, the process provides for the combination of a low temperature treatment (e.g. 50–200° C. depending on the boiling range of the compounds) for evaporating volatile organic compounds from the containers followed by high temperature treatment (e.g. up to about 600° C. or even higher depending on circumstances) in the same furnace. Volatile gases generated at both process levels are incinerated in the primary furnace, typically at temperatures over 700° C. The combustion process is finished in an afterburner at a temperature of about 980° C. to 1200° C. (with a residence time over 1 sec. depending on circumstances). All gases are treated in wet scrubber designed to remove SOx and other gases to comply with all state and provincial regulations.

IN DRAWINGS WHICH ILLUSTRATE AN EMBODIMENT OF THE INVENTION

DETAILED DESCRIPTION OF THE PREFERRED EMBODIMENT

Figure 1:
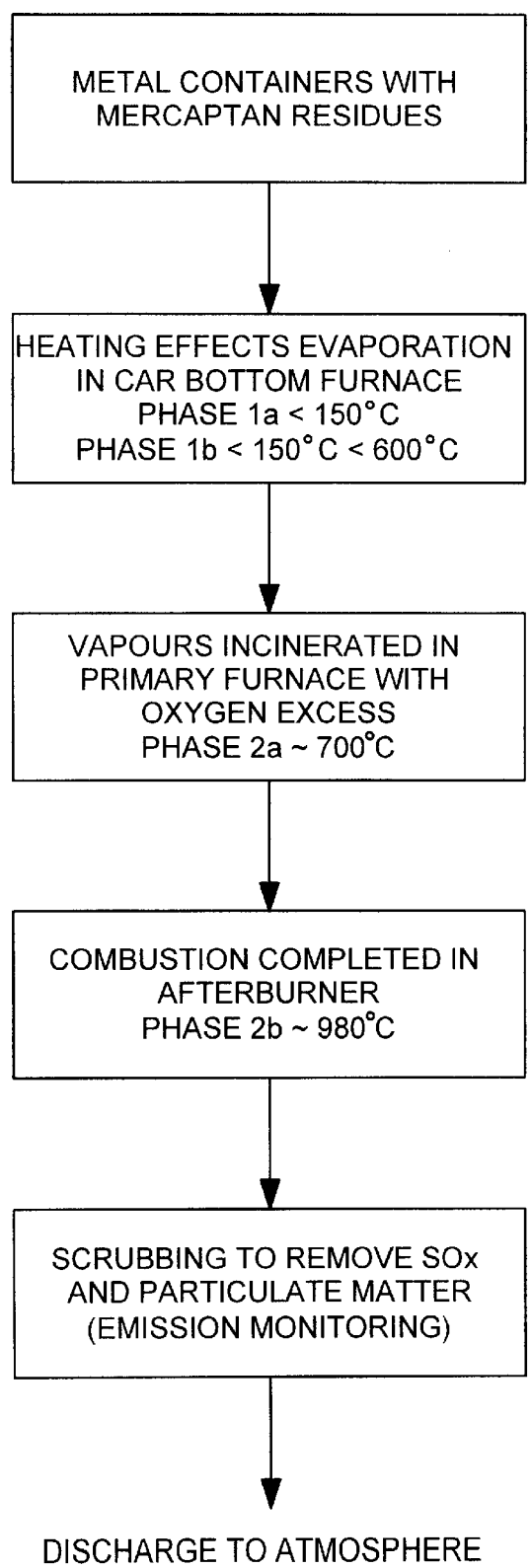
FIG. 1 is a flow chart depicting the main steps in the process.

A brief description of the process as applied to the destruction of mercaptans follows with reference to the flow chart of FIG. 1.

Phases 1a and 1b comprise evaporation and decomposition without combustion. Phase 1a:

Heating of containers containing odorants and/or other odorant residues at temperatures below approximately 150° C. is effected in a car bottom furnace to evaporate the odorant through a manifold (into the next phase, i.e. the primary furnace) without sufficient oxygen to support combustion or other chemical reactions which would otherwise generate excess heat and pressure; (since most odorants autoignite at approximately 200° C., a temperature of not exceeding about 150° C. was chosen as a maximum evaporation temperature in phase 1a to effect evaporation while avoiding autoignition and possible explosion).

Phase 1b:

Controlled heating of the containers of odorant and their residues from below or about 150° C. up to about 600° C. is effected. The purpose of this stage is to continue evaporation and decomposition of odorants in the enclosed container in a non-combustion supporting environment prior to incineration.

Phases 2a and 2b involve incineration, afterburning and scrubbing.

Phase 2a:

All vapors and decomposed gasesare directed first to the primary furnace to incinerate in the presence of excess oxygen at approximately 700 degrees C minimum.

Phase 2b:

Next, the incinerated gases are directed from the primary furnace to the afterburner, completing the incineration process at about 980° C.

Finally all gases go through a wet scrubbing process to remove SOx, particulate material, and/or any other acidic gas components using sodium hydroxide as the neutralizing agent.

Figure 2:
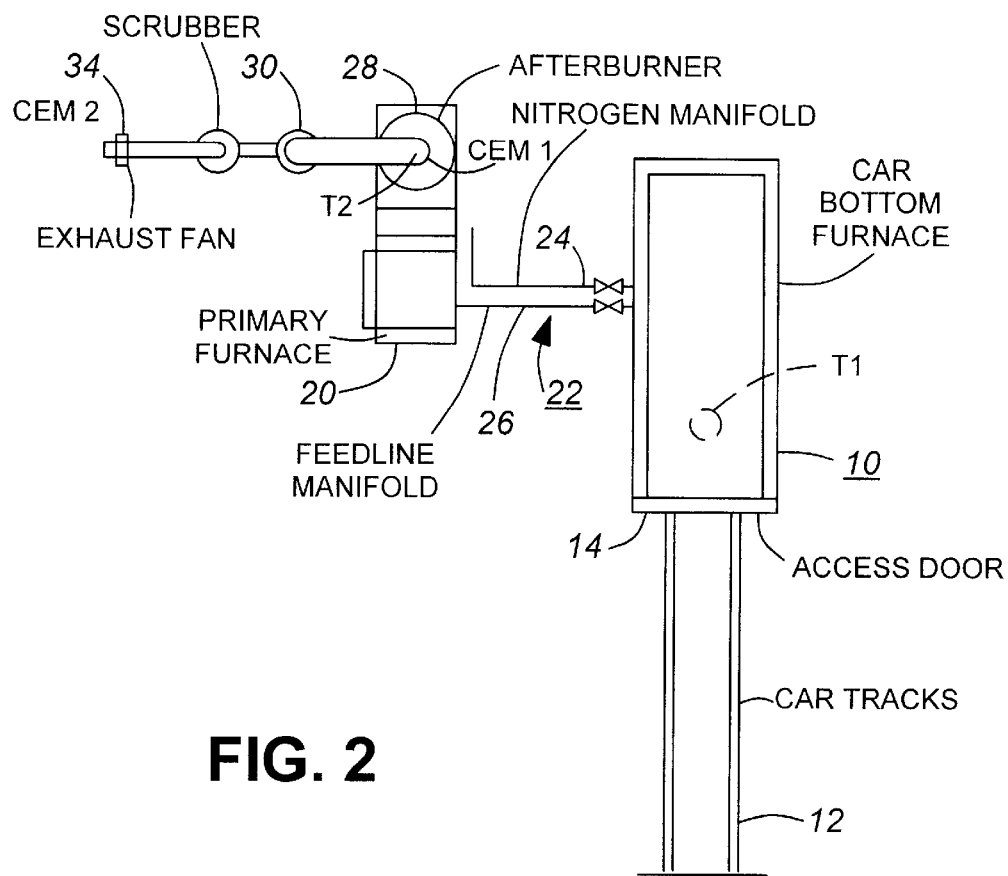
FIG. 2 is a plan view showing the layout of the main pieces of equipment used.
Figure 3:
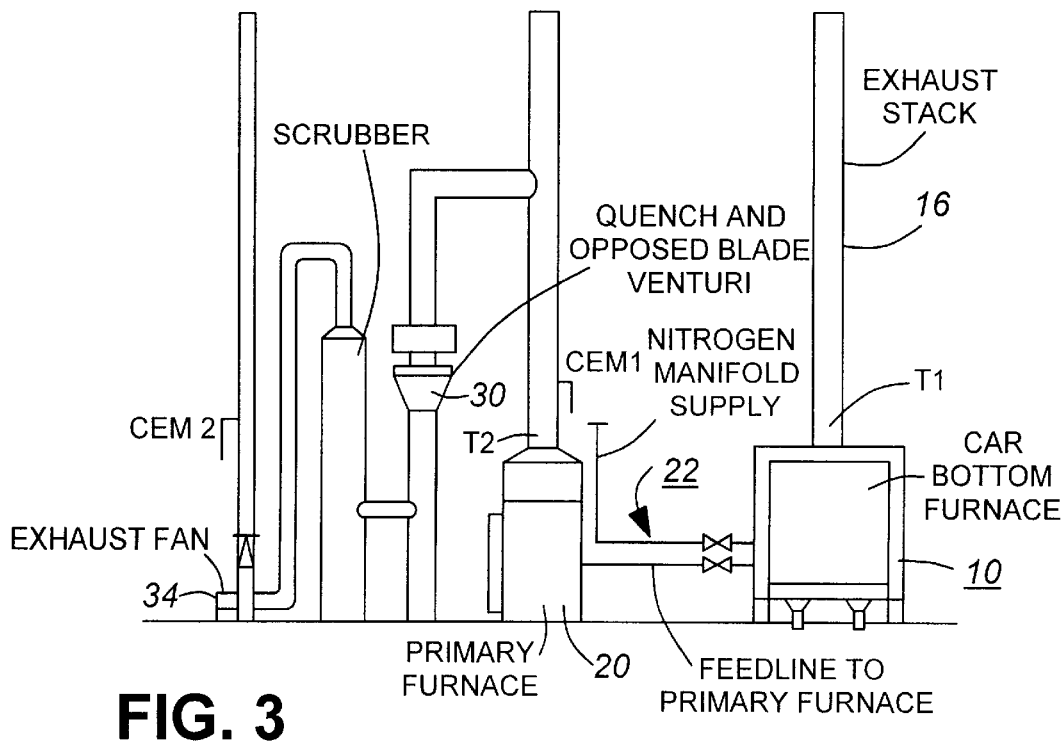
FIG. 3 is an elevation view of the equipment shown in FIG. 2.
Figure 4:
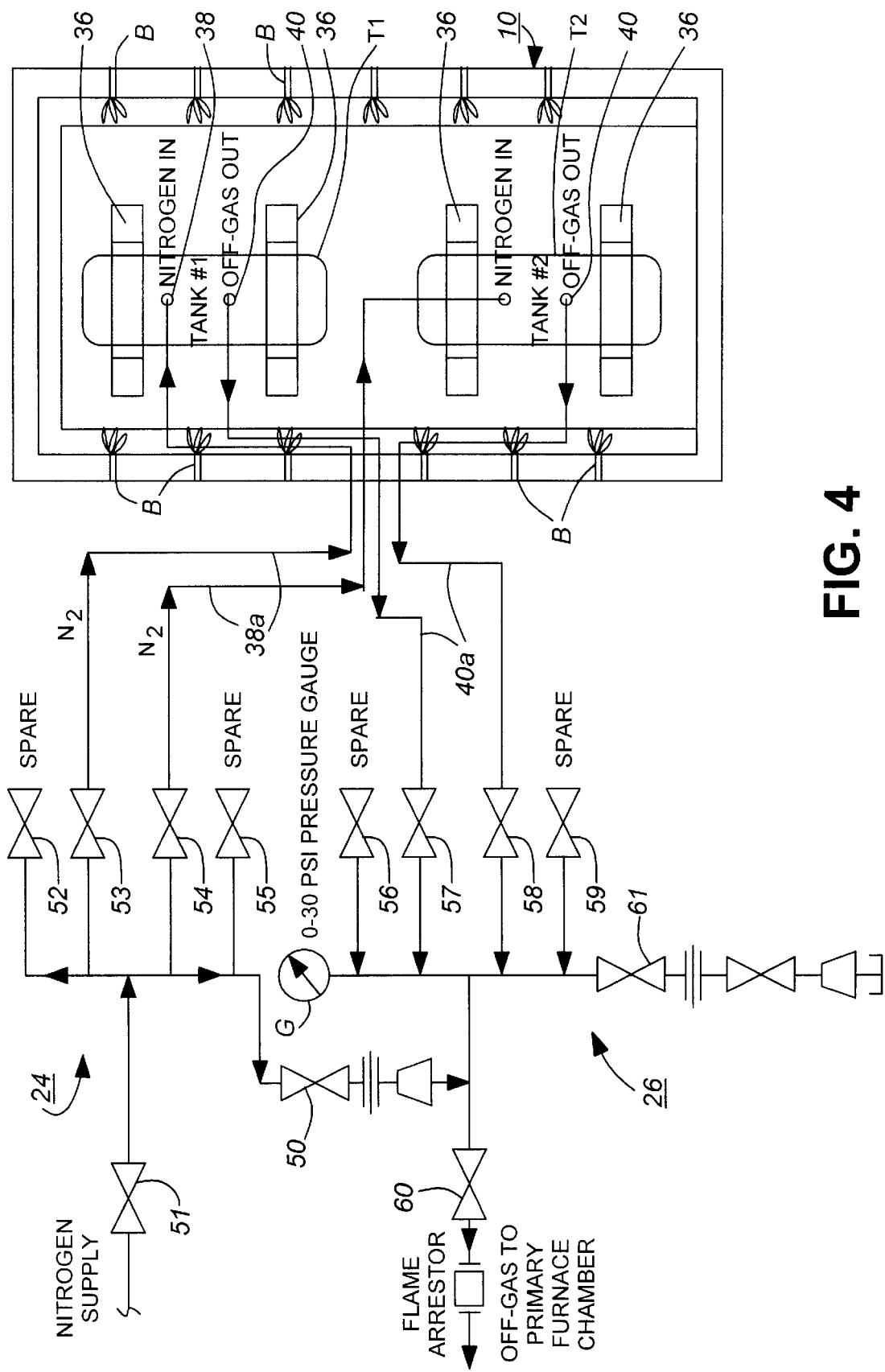
FIG. 4 is a diagrammatic view showing connections between the manifold and tanks to be decontaminated.

Referring to FIGS. 2 and 3 there is shown a car-bottom furnace 10 (e.g. as manufactured by United Group Inc. of Topeka, Kansas) mounted on tracks 12 so that the furnace 10 may be rolled into and out of loading and operating positions. Furnace 10 has an access door 14 at one end for loading and unloading of metal containers T (FIG. 4). An exhaust stack 16 vents combustion products generated by the gas-fired heaters disposed within furnace 10.

Car bottom furnace 10 is equipped with 12 gas-fired burners B, 6 on the top of the furnace and six on the lower part to allow temperature control and heat distribution. The control system of FIG. 6 effects the operation of the burners B in well-known fashion to achieve the desired result.

Figure 6:
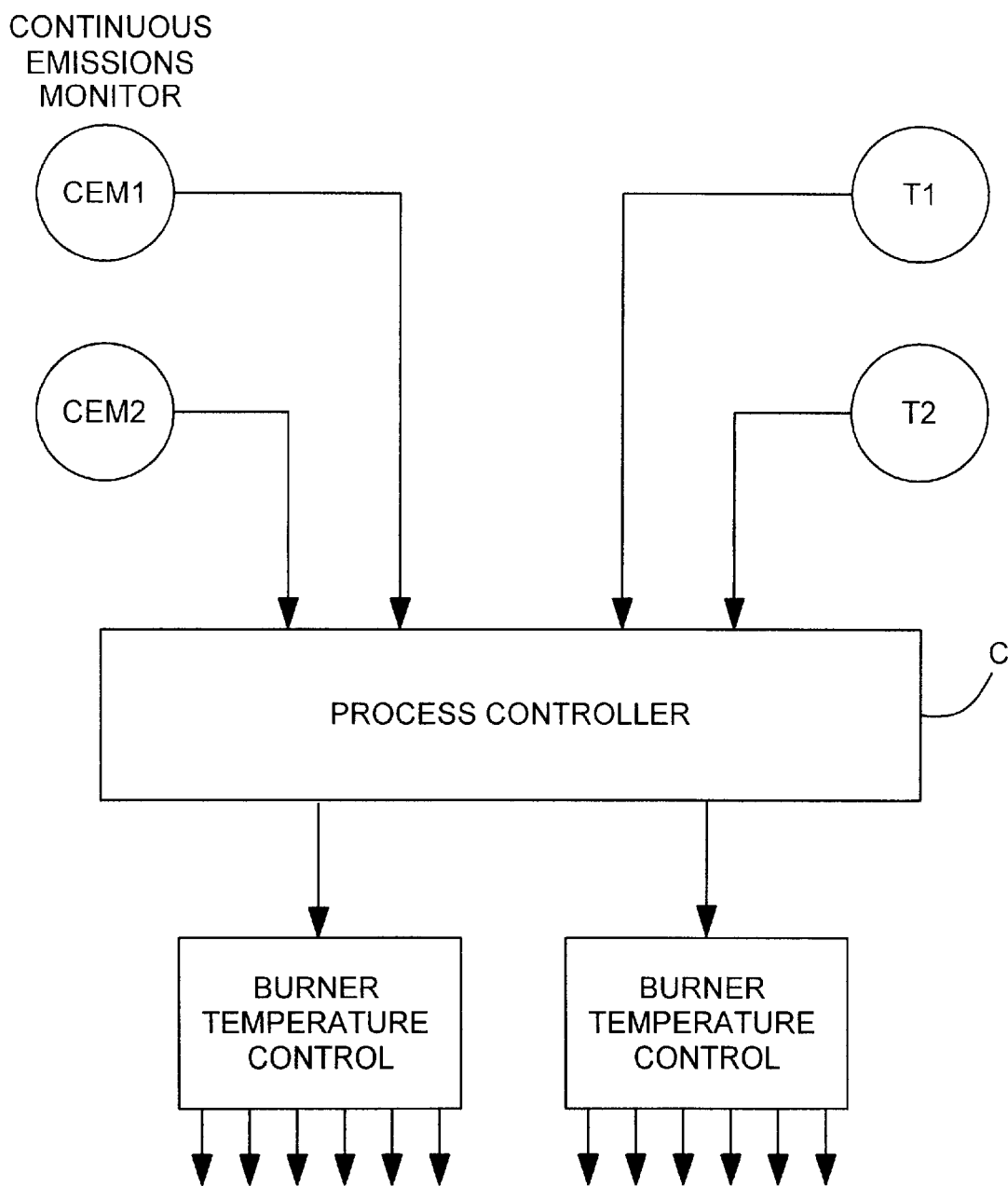
FIG. 6 is a schematic view of the furnace temperature control system.

The control system of FIG. 6 may be of a standard commercially available variety and includes a computerized process controller C receiving inputs from sensors CEM1 and CEM2 and temperature sensors T1 and T2 all located as indicated in FIG. 3. Process controller C is programmed to produce outputs to the burner controls to control the temperature in the car bottom furnace in a manner to be described more fully hereafter.

A second furnace 20 termed the primary furnace (e.g. by United Group Inc.) is positioned a short distance from the car bottom furnace 10 when the latter is in the operating position and a manifold system 22 (FIG. 2) extends between them. Primary furnace 20 is provided with a conventional gas burner and temperature controls (not shown) capable of maintaining temperatures of about 500–120° C. as required.

Manifold system 22 includes a nitrogen manifold 24 and a feedline manifold 26 (FIG. 4). Nitrogen manifold 24 supplies nitrogen gas to the interiors of the containers T as described hereafter. Feedline manifold 26 carries vaporized gases from the containers into the primary furnace 20 during operation.

Combustion products leaving the primary furnace 20 pass into a conventional afterburner 28 (FIG. 2) where combustion of gases is completed, with the exhaust gases thence passing through a scrubbing system including a quench and opposed blade venturi system 30 (e.g. by Anderson 2000 Inc. of Peach Tree City, G.) to remove oxides of sulfur (SOx) and particulate materials thereby to ensure that final emissions satisfy Governmental regulations. An exhaust fan 34 (FIG. 2) induces the flow of exhaust gases through these components in well-known manner.

As shown in FIG. 4 the containers T containing the contaminants to be destroyed are loaded into the car bottom furnace 10 and positioned on cradles 36. Each container T has an inlet and an outlet opening 38 and 40 respectively. Inlets 38 are connected by metal piping 38a to nitrogen manifold 24 while outlets 40 are connected via metal pipes 40a to the feedline manifold 26 which supplies the vaporized compounds to primary furnace 20.

Temperature control in car bottom furnace 10 allows controlled evaporation of organic solvents and regulates the feed of vapors into primary furnace 20 for incineration. As the temperature in the car bottom furnace 10 increases, higher boiling solvents are evaporated into primary furnace 20. As the content of low boiling solvents in containers T decreases, the temperature in car bottom furnace 10 is increased in increments to evaporate higher boiling solvents and pass same into primary furnace 20.

Monitoring of exhaust gas sulfur dioxide content and the temperatures in car bottom furnace 10 and primary furnace 20 indicates the phase or stage of the evaporation process. For mercaptans and other sulfur containing solvents, sludges or solids, continuous monitoring of sulfur dioxide content provides process stage data. For other hydrocarbons the temperature of primary furnace 20 is directly related to the amount of hydrocarbon gases entering the primary furnace. For example, a decreasing measured concentration of sulfur dioxide and decreasing measured primary furnace temperatures at a fixed temperature of the car bottom furnace 10 indicates that the process temperature of the car bottom furnace 10 can be increased to cause evaporation of higher boiling components.

At the second (phase 1b) high temperature part of the treatment (above 150° C. for mercaptans) two processes can occur simultaneously, namely, evaporation of higher boiling solvent(s) and thermal decomposition of residue(s) of low boiling solvent(s). The decomposition of any residue(s) of the by-now largely evaporated components does not present any danger of pressure build-up in containers T.

The temperature in the second (phase 1b) part of the treatment is increased in 10° C. increments up to about 300° C. and above 300° C. in about 30° C. increments. The temperature is raised in these increments generally up to about 600° C. Containers T are kept at this temperature for at least an hour, or until all residues of volatile components are incinerated. The process temperature can be raised up to about 1000° C., in the event such temperatures are needed to purge low volatility high boiling components.

The treated containers T are then cooled down to ambient temperature, tested for volatile gases and then approved for dismantling, cutting and transport to metal recyclers.

Figure 5:
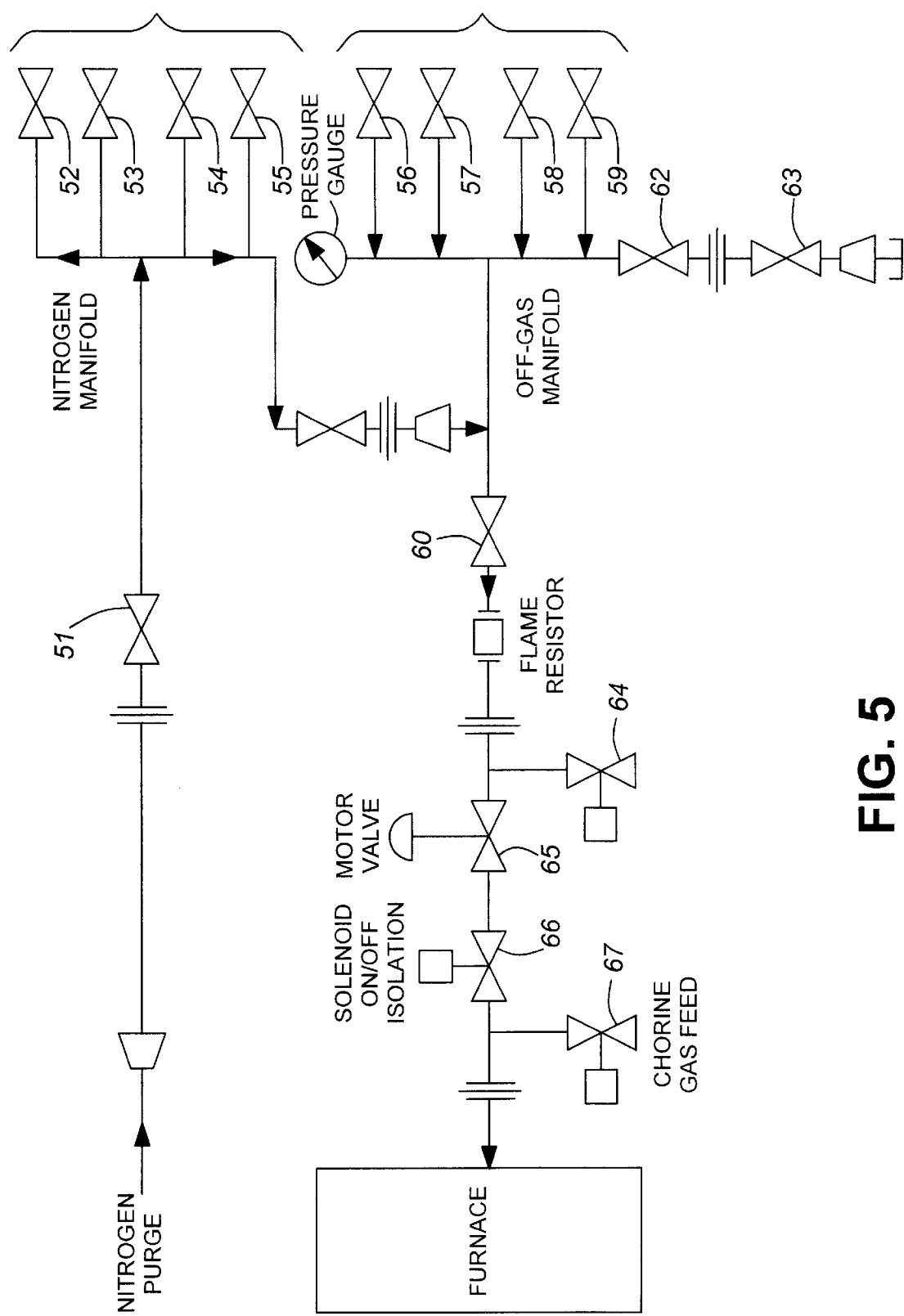
FIG. 5 is a schematic of the manifold system.

The operation of the treatment system is set forth in more detail as follows beginning with the pressure testing and pressure release procedures:

As shown in FIGS. 4 and 5 the containers T to be treated are placed on the cradles 36 of the car bottom furnace 10 and connected through valves 51 and 53, 54 (in lines 38a) to the nitrogen source. Valves 57 and 58 in lines 40a connect containers T to the feedline manifold 26, leading to the primary furnace 20. With valves 51, 53 and 57 open and valves 50, 52, 54, 55, 56, 58, 59, 60 and 61 closed, the nitrogen pressurizes container T1 to about 5–10 psi. Pressure gauge G on feed manifold 26 (FIG. 4) indicates the pressure in the container T1. Container T1 is kept at this pressure for 5 minutes. Leaks are detected in a conventional manner by pressure loss and soaping of the valves and connection points and corrected as necessary. The second step of the procedure, i.e. release of the pressure into primary furnace 20 is to check to ensure free passage of gases through the system during operation, which prevents pressure build-up in container T1. This step for container T1 requires that nitrogen supply valves 51, 53 be closed and that valves 57, 60, 65 and 66 (FIG. 5) be open to release the gases into primary furnace 20. Container T2 is then tested for pressure and the pressure released using essentially the same procedure but using different valves as required.

The pressure testing and pressure release processes serve to prevent the following two problems. Any leak of odorants or other solvents into the heating chamber of furnace 10 could cause a release of these substances into atmosphere and also generate an explosive mixture in the heating furnace 10. Any restriction of gas through flow into primary furnace 20 during the heating process could lead to pressure build-up in treated containers T and eventual explosion. Pressure testing can also be applied either simultaneously or sequentially to several containers using other valves of the nitrogen and feed manifolds.

Once the pressure testing is finished and with primary furnace 20, afterburner 28 and scrubber in operating condition. (e.g. the burners therein firing to provide the necessary temperatures), two burners of the car bottom furnace 10 are ignited and the low temperature process (phase 1a) starts.

As the temperature in the car bottom furnace 10 is rising, mostly low boiling solvents are being evaporated and pass via the lines 40a and manifold system 26 into primary furnace 20 where the incineration process starts. The primary furnace temperature is at least 700° C. at this stage. After approximately 90–120 minutes of heating the car bottom furnace temperature is raised to approximately 150° C. (at the stack entrance point). Low boiling solvents including odorants are being evaporated since their boiling range is mostly in the range from 35° C. to 124° C. At all times there is insufficient oxygen in the containers T being treated to support combustion therein.

The feed rate of evaporating solvents into primary furnace 20 is monitored as noted above by sensing the temperature of the primary furnace 20 and/or by the use of the SOx monitor in the afterburner stack, which indicates the concentration of the sulfur containing odorants being fed into the primary furnace 20. The feed rate into primary furnace 20 is controlled by the control system of FIG. 6 which varies the temperature setting in the car bottom furnace 10 by varying the temperature settings or number and positions of burners being fired.

The treated containers are kept at a low temperature, not exceeding about 150° C., until the sensed levels or SOx begin to decrease, thus indicating completion of the low temperature phase 1a. At the end of this phase, there is virtually no free low boiling liquid solvent or odorant in the treated container(s) T. Container(s) T still however contain vapors of evaporated solvents and these are further evaporated and incinerated in the subsequent high temperature phase 1b. In this phase, more burners are switched on by the control system and the temperature in the car bottom furnace 10 is raised in increments of about 10° C. The indication point for the next temperature increase is, again, a decreasing measured level of SOx in the afterburner stack and/or a decrease in the temperature of the primary furnace 20. (The temperature in the primary furnace 20 is generally constant, unless other sources of heat energy from car bottom furnace 10 are introduced.) If these compounds are present both SOx levels and temperatures must decrease before increasing the temperature in the primary furnace.

The process can be finished by raising the car bottom temperature to 600° C. Tanks/containers are typically kept at this temperature for one hour.

The tanks are cooled then in the furnace, and after testing for presence of volatile compounds, (which test must prove the absence of these compounds), the tanks are cut and the metal is sent for recycling.

The dismantling and cutting open of treated tanks reveals that there are no residual liquids or sludges after such treatment, no residual smell of odorants and very little carbonized residue.

The present invention will be further demonstrated by the following examples but is by no means limited to them

EXAMPLE 1

Decontamination of 85 gal. Peerless metal odorizer tanks containing liquid residues of odorant, consisting of tertiary butyl mercaptan, methylethylsulfide and accumulated higher boiling hydrocarbons.

Once the pressure testing with nitrogen as described previously has been completed and the primary furnace with afterburner and scrubber are in the operational mode, the phase 1a treatment is started by switching two burners of the car bottom furnace on and letting the temperature rise slowly, (within 90–120 minutes) up to 150° C. at the stack entry.

During this slow temperature rise, tertiary butylmercaptan and methylethylsulfide (boiling range 62–70° C.) are evaporated slowly into the primary furnace. The feed is controlled by switching off burners, lowering temperature settings, or changing the positions of burners being used in the car bottom furnace. At a temperature of 150° C., both tertiary butyl mercaptan, methylethyldisulfide and any low boiling hydrocarbons are evaporated into the primary furnace and only their vapors, (corresponding to the temperature of car bottom furnace) are present in the container T. SOx levels in afterburner and the temperature in the primary furnace then decrease indicating the end of the low temperature phase 1a (due to the reduced flow of vapors into the primary furnace).

During the following high temperature phase 1b, the temperature in the- car bottom furnace is initially raised by increments of 10° C. The indication for the next temperature increase is a decreasing level of measured SOx and temperature in the primary furnace. The primary reason for such a low rate of increase of the temperature is to avoid rapid decomposition of the remaining hydrocarbons in liquid or solid form, which would otherwise tend to overload the system.

Containers T are kept at final, 600° C. temperature for at least an hour, or until all gases are evaporated and purged out of containers at this temperature. Final inspection of cut and dismantled tanks shows no residues inside of the containers, except for occasional, small amounts of carbonized material.

EXAMPLE No. 2

Decontamination of several containers containing kerosene, odorant mix and other higher boiling hydrocarbons.

Pressure testing is performed on each tank separately as described above and if successful and complete, (with the primary furnace, afterburner and scrubber in operational mode) treatment is started. Temperature is raised slowly (within 90–120 minutes) up to 150° C. at the stack entry.

During this low temperature phase 1a, kerosene, odorants and parts of other hydrocarbons are evaporated into the primary furnace for incineration. The feed is controlled by the process controller by switching off burners, changing temperature settings, or positions of burners used. At a temperature of 150° C., most of the low boiling hydrocarbons are evaporated into the primary furnace. Higher boiling components are slowly being evaporated. SOx levels in the afterburner and the temperature in the primary furnace then decrease indicating the end of the low temperature stage.

During the high temperature phase 1b temperature in the car bottom furnace is raised by increments of 10° C. The indication for the next temperature increase is a decreasing level of SOx and decreasing temperature in the primary furnace. These higher boiling components are evaporated and at higher temperatures thermally decomposed and the products of decomposition are incinerated in the primary furnace.

The containers are kept at a final, 600° C. temperature for at least an hour, or until all gases are evaporated and purged out of the containers at this temperature.

Final inspection of cut and dismantled tanks shows no residues inside of the containers except for occasional, small amounts of carbonized material.

Preferred embodiments of the invention have been described and illustrated by way of example. Those skilled in the art will realize that various modifications and changes may be made while still remaining within the spirit and scope of the invention. Hence the invention is not to be limited to the embodiments as described but, rather, the invention encompasses the full range of equivalencies as defined by the appended claims.

What is claimed is:

1. A process for the destruction of volatile organic compound(s) comprising: heating said compound(s) in a first furnace by gradually increasing temperatures therein to levels at least adequate to effect evaporation of the compound(s) under conditions which do not support the combustion of said compound(s); said compound(s) being in the form of residues in a closed container, with said container being positioned in said first furnace prior to said heating step; connecting the interior of said container directly to a system capable of conducting said vapors generated by the heating step from the interior of the container into a second furnace and incinerating said vapors in the second furnace in the presence of sufficient oxygen as to support the combustion of said vapors; said process including the further steps of supplying inert gas under pressure to the interior of said container and then releasing the pressurized inert gas into said second furnace by way of said system prior to effecting the heating step whereby to ensure against leakage of said vapors into the interior of said first furnace during said heating step.

2. The process of claim 1 wherein said heating step comprises gradually raising the temperature in said first furnace to initially evaporate the lower boiling and more volatile compound(s) with evaporation of higher boiling compound(s) following thereafter as the temperature in said first furnace is raised to and held at higher levels for selected periods of time to complete the evaporation and to decompose and/or carbonize any remaining said compounds.

3. The process according to claim 2 wherein said compounds comprise sulfur-containing odorants for natural gas.

4. The process according to claim 2 wherein said compound(s) are selected from the group of odorants consisting of dimethyl sulfide, methyl ethyl sulfide, isopropyl mercaptan, normal propyl mercaptan, secondary butyl mercaptan, ethyl mercaptan, and tetrahydrothiophene.

5. The process of claim 1 wherein said first furnace has a heater therein to generate the desired temperatures therein, and wherein said second furnace comprises a furnace wherein incineration of the vapors released during the heating step is effected.

6. The process of claim 2 wherein said first furnace has a heater therein to generate the desired temperatures therein, and wherein said second furnace comprises a furnace wherein incineration of the vapors released during the heating step is effected.

7. The process of claim 1 including passing combustion products from said second furnace through an afterburner to complete the combustion process.

8. Apparatus for the destruction of volatile organic compounds which are in the form of residues in a closed metal container comprising:

a) a first furnace having a heating device for heating said compounds to temperatures at least adequate to effect evaporation thereof under conditions which do not support combustion of said compounds; said first furnace being adapted to receive said metal container therein prior to the heating thereof;

b) a second furnace adapted to receive a supply of oxygen therein for incinerating the vapors generated by the heating in the first furnace;

c) a system for transporting the vapors from the first furnace to the second furnace while maintaining said non-combustion supporting conditions until the vapors reach the interior of the second furnace, said vapor transporting system being capable of being directly attached to the metal container for conducting said vapors away from the interior of the metal container and into the interior of second furnace in such a manner that said vapors do not escape into the interior of the first furnace; and d) said vapour transporting system being associated with a manifold system adapted to supply inert gases into the interior of said metal container to pressurize the interior of the container prior to said heating in the first furnace, said vapour transporting system being adapted to subsequently release the pressurized inert gases into said second furnace also prior to commencement of the heating in said first furnace.

9. The apparatus of claim 8 including an afterburner through which combustion products from said second furnace are passed to complete the combustion process.

* * * * *